3,192,286
PROCESS FOR ISOMERIZATION OF HEXANES
William L. Houston, Jr., and John B. Anderson, Sweeny, Tex., assignors to Phillips Petroleum Company, a corporation of Delaware
Filed Dec. 8, 1961, Ser. No. 157,980
6 Claims. (Cl. 260—683.73)

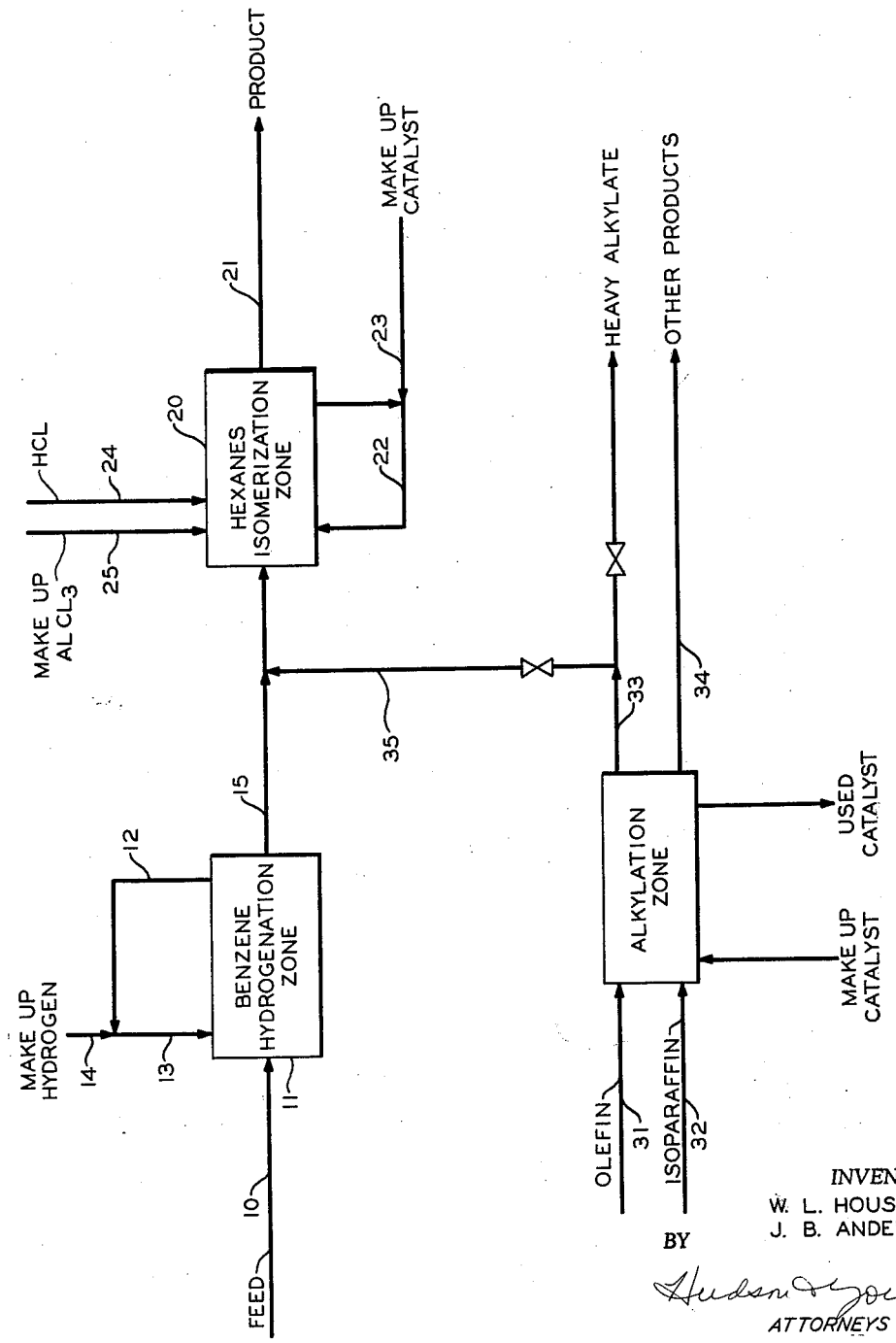

This invention relates to a process and/or apparatus for isomerizing methylcyclopentane and normal hexane to cyclohexane and isohexane, respectively. In one of its aspects, the invention relates to the isomerization of methyl cyclopentane and normal hexane in the presence of a metal halide-hydrocarbon complex wherein the complex is maintained at a sufficiently high inventorial level using a portion of an alkylate to promote maximum conversion of the feed to the desired ultimate products, thereby increasing the yield of the cyclohexane and isohexane products in the isomerization reaction.

The isomerization of methylcyclopentane and normal hexane to cyclohexane and isohexane is customarily carried out in the presence of an aluminum chloride-hydrocarbon complex in the presence of a hydrogen chloride promoter. Occasionally, the aluminum chloride-hydrocarbon complex is not formed in the reaction vessel as fast as it is lost out of the system. The loss of complex from the system can be due to operational upsets or to removal of a portion of the complex because of reduced catalyst activity. New catalyst complex is formed in the system by virtue of the addition of aluminum chloride to the reaction vessel where the aluminum chloride forms a new complex with hydrocarbons present in the vessel. As has been pointed out, the complex is not always formed at a sufficiently rapid rate and the inventory of the complex in the system may be lower than that which is necessary for optimum operation. We have found that the addition of a small quantity of heavy alkylate into the isomerization unit feed increases the rate of formation of the catalyst complex. This addition maintains a sufficient inventory of catalyst complex to operate the isomerization unit properly.

The heavy alkylate is usually produced in the HF-alkylation of isobutane with propylenes and butylenes according to a process well known in the hydrocarbon alkylation art. See, for example, U.S. Patent 2,773,920, issued December 11, 1956 to L. H. Vautrain and Edward Strunk, and U.S. Patent 2,759,032, issued August 14, 1956, to R. E. Dixon.

It is an object of this invention to provide an improved isomerization process for the conversion of methylcyclopentane and hexane to cyclohexane and isohexane, respectively. It is another object of this invention to maintain a proper inventory of aluminum chloride-hydrocarbon complex in the isomerization unit at all times in order to obtain increased yields of isohexane and cyclohexane.

Other aspects, objects and the several advantages of the invention are apparent from a study of this disclosure, the drawing and the appended claims.

Thus, according to the invention there is provided a method for the isomerization of methylcyclopentane and normal hexane to cyclohexane and isohexane, respectively, in which there is added to the feed to the isomerization zone a small quantity of heavy alkylate, the heavy alkylate being in sufficient amount to maintain in the isomerization zone a sufficient inventory of a metal halide-hydrocarbon complex to promote maximum conversion of the feed to the desired ultimate products of cyclohexane and isohexane.

The accompanying drawing is a diagrammatic flow sheet illustrating one embodiment of the invention. In the drawing, all pumps, coolers, heaters, condensers, valves, surge vessels, etc., have been omitted to simplify the explanation thereof. However, it is to be understood that the process of the invention includes such auxiliary equipment of this type which is necessary for the operation thereof.

Referring now to the drawing, the invention will be more fully explained. A feed stream comprising methylcyclopentane, benzene and normal hexane enters a hydrogenation zone through conduit 10. The hydrogention zone is shown at 11. A recycle circuit comprising conduits 12 and 13 recycles hydrogen through the system. Make-up hydrogen is supplied as necessary through conduit 14. In the hydrogenation zone, benzene is hydrogenated to cyclohexane. Products of the hydrogenation zone containing methylcyclopentane, cyclohexane, and normal hexane, are passed through conduit 15 to the hexanes isomerization zone 20. Products including cyclohexane and isohexanes are withdrawn by conduit 21. Catalyst and catalyst complex are cycled through the isomerization zone 20, being returned from the end of the system to the beginning of the isomerization zone by conduit 22. If required, make-up catalyst can be introduced through conduit 23 and make-up hydrogen chloride can be added as required by conduit 24.

In the hexanes isomerization zone 20, methylclopentane and normal hexane are isomerized to the desired products cyclohexane and isohexanes, respectively. This isomerization takes place within the presence of an aluminum chloride-hydrocarbon complex promoted by hydrogen chloride. It is normal to this type of operation that some of the catalyst complex is removed from the system on a more or less continuous basis. The removed complex must be replaced to hold the catalyst at optimum levels. The addition of aluminum chloride to the system, as at 25, has been used in the past to provide the make-up catalyst required. The aluminum chloride then combines with hydrocarbons in the isomerization zone to form the aluminum chloride-hydrocarbon complex necessary for the successful operation of the isomerization system. There are occasional system upsets which result in loss of additional hydrocarbon complex which require even more replacements of catalyst and catalyst complex to the system.

The exact nature of the aluminum chloride-hydrocarbon complex is not known, nor is it known exactly to what extent or how it is formed in the isomerization zone. We have discovered that the formation of the aluminum chloride-hydrocarbon complex can be increased greatly with a resulting increase in yield of the cyclohexane and isohexane products by adding a heavy alkylate to the feed to the isomerization zone. Heavy alkylate can be added conveniently through a pipe or conduit such as that shown at 35 in the drawing. The alkylate is formed in an alkylation zone 30 from a feed stream of olefin entering the zone through conduit 31 and isoparaffin entering the zone through conduit 32. The heavy alkylate portion of the products of the alkylation zone is withdrawn through conduit 33 where any desired portion of this heavy alkylate stream can be taken through conduit 35 to the hexanes isomerization zone. The other products of the alkylation zone are withdrawn through conduit 34. It is to be understood that the alkylation zone is an entirely separate operation and has no connection with the isomerization other than to supply heavy akylate which is used to accelerate the formation of the aluminum chloride-hydrocarbon complex in the isomerization zone.

It is to be mentioned that while aluminum chloride has been used as the catalyst in this operation, other metal halides can be used. Any of the catalytic aluminum halides can be used to form such complex catalyst but the cost of some is prohibitive. Aluminum bromide and aluminum iodide are both examples of suitable but some-what more costly catalysts. Aluminum chloride is the halide of aluminum used in most commercial processes because of its cheapness and availability in an anhydrous granular form. This invention is especially effective when applied to the use of granular anhydrous aluminum chloride.

The following example is illustrative of the improvement in the conversion rate of normal hexane to isohexane that has been obtained through the use of this invention. In the example, the rate of conversion is meant to be the percentage of the normal hexane feed which is converted to isohexane during its residence in the isomerization zone.

*Example*

|  | Conventional Operation | Operation According to This Invention |
|---|---|---|
| Total hydrocarbon feed to the Isomerization Reactor _____ barrels per hr__ | 220 | 220 |
| Alkylate¹ Addition _____ barrels per hr__ | ---------- | 1 |
| n-Hexane Conversion—rate of Conversion to iso-hexane _____ percent__ | 31 | 40 |

¹ The characteristics of the heavy alkylate are: 53° API, 365° F. initial boiling point, 392° F. 50% point and 530° F. end point.

In the preceding example, addition of heavy alkylate to the isomerization feed is in the approximate rate of ½ of 1 percent of the total feed. Other addition rates of alkylate are permissible and have been found successful. For example, rates of approximately .25 percent to rates approximating 1½ percent have been successful according to other operating conditions in the system at the time. It is within the scope of this invention to use even lower addition rates such as 0.1 percent to rates even higher than 1.5 percent, as necessary.

The isomerization using aluminum chloride complex is conventional except as modified by this invention. U.S. Patent 2,999,890, issued Sept. 12, 1961, to Joseph W. Davison describes such an operation.

Reasonable variation and modification are possible within the scope of the foregoing disclosure, drawing, and the appended claims to the invention, the essence of which is that methylcyclopentane, benzene and normal hexane are first hydrogenated to convert the benzene to cyclohexane, the resultant stream of cyclohexane, methylcyclopentane, and normal hexane is then fed to an isomerization zone where methylcyclopentane is isomerized to cyclohexane and the normal hexane is isomerized to isohexane, all in the presence of an aluminum chloride-hydrocarbon complex promoted by hydrogen chloride and where the rate of the aluminum chloride-hydrocarbon complex formation within the isomerization zone is accelerated by the addition of a small percentage of heavy alkylate in the feed to the isomerization zone.

We claim:

1. In a process for the production of cyclohexane and isohexane in which the starting materials are methylcyclopentane, benzene, and normal hexane and in which the benzene is hydrogenated to form cyclohexane in a hydrogenation zone, and in which methylcyclopentane and hexane are isomerized in the presence of an aluminum chloride-hydrocarbon complex catalyst promoted by anhydrous hydrogen chloride in an isomerization zone to yield cyclohexane and isohexane, respectively, and in which the inventory of the aluminum chloride-hydrocarbon complex formed in and maintained within the said isomerization zone may be reduced through operational upsets or other causes, the improvement which comprises introducing make up aluminum chloride to said isomerization zone and adding to the feed to the isomerization zone from about 0.1 percent to about 1.5 percent by volume of the feed of a heavy alkylate to increase the rate of formation of said complex in said isomerization zone wherein said heavy alkylate is a product of the alkylation of an olefin and an isoparaffin.

2. The process of claim 1 wherein the quantity of heavy alkylate added to the feed to the isomerization zone is from 0.2 percent to 0.7 percent of the said feed.

3. An isomerization process comprising the steps of:
   (a) passing a $C_6$ hydrocarbon containing feedstream to an isomerization zone;
   (b) introducing aluminum halide catalyst to said isomerization zone together with hydrogen chloride promoter;
   (c) adding a controlled amount of the heavy alkylate product of the alkylation of an olefin and an isoparaffin to said feedstream, whereby the rate of aluminum halide hydrocarbon complex formation within the said isomerization zone is accelerated and the yield of conversion products is increased; and
   (d) removing the thus isomerized products from said isomerization zone.

4. The process of claim 3 in which the aluminum halide is aluminum chloride.

5. The process of claim 3 in which the said heavy alkylate product has an initial boiling point of about 365° F., a 50 percent point of about 392° F. and an end point of about 530° F.

6. The process of claim 3, in which the heavy alkylate product added to the feed amounts to from about 0.1 percent to about 1.5 percent of the total feed.

References Cited by the Examiner

UNITED STATES PATENTS

| 2,475,358 | 7/49 | Moore et al. | 260—683.75 X |
| 2,847,488 | 8/58 | Boynton et al. | 260—683.75 X |
| 2,999,890 | 9/61 | Davidson | 260—683.73 X |
| 3,052,743 | 9/62 | Beavon | 260—683.49 X |

FOREIGN PATENTS 663,068  12/51  Great Britain.

ALPHONSO D. SULLIVAN, *Primary Examiner.*